US012629313B2

(12) United States Patent
Liu

(10) Patent No.: US 12,629,313 B2
(45) Date of Patent: May 19, 2026

(54) MALE MASTURBATING APPARATUS

(71) Applicant: HYTTO PTE. LTD, Singapore (SG)

(72) Inventor: Dan Liu, Guangzhou (CN)

(73) Assignee: HYTTO PTE. LTD., Singapore (SG)

( * ) Notice: Subject to any disclaimer, the term of this patent is extended or adjusted under 35 U.S.C. 154(b) by 0 days.

(21) Appl. No.: 18/978,972

(22) Filed: Dec. 12, 2024

(65) Prior Publication Data

US 2025/0107957 A1 Apr. 3, 2025

Related U.S. Application Data

(63) Continuation of application No. 17/401,234, filed on Aug. 12, 2021, now Pat. No. 12,186,255.

(51) Int. Cl.
*A61H 19/00* (2006.01)

(52) U.S. Cl.
CPC ....... *A61H 19/32* (2013.01); *A61H 2201/169* (2013.01); *A61H 2201/501* (2013.01); *A61H 2201/5061* (2013.01); *A61H 2201/5097* (2013.01)

(58) Field of Classification Search
CPC ........ A61H 19/00; A61H 19/30; A61H 19/32; A61F 5/41; A61F 2005/411; A61F 2005/412; A61F 2005/417
USPC .......................................................... 600/38
See application file for complete search history.

(56) References Cited

U.S. PATENT DOCUMENTS

| | | | | |
|---|---|---|---|---|
| 10,456,323 | B2 * | 10/2019 | Murison | A61H 23/04 |
| 2003/0036678 | A1 * | 2/2003 | Abbassi | A61H 19/40 340/407.1 |
| 2008/0065187 | A1 * | 3/2008 | Squicciarini | A61H 23/02 600/38 |
| 2010/0041944 | A1 * | 2/2010 | Levy | A61H 19/32 600/38 |
| 2018/0344565 | A1 * | 12/2018 | Sloan | A61H 19/32 |
| 2020/0366972 | A1 * | 11/2020 | Sloan | H04N 21/4751 |
| 2021/0015700 | A1 * | 1/2021 | Truckai | A61H 9/0057 |

* cited by examiner

*Primary Examiner* — Samuel G Gilbert
(74) *Attorney, Agent, or Firm* — Holtz, Holtz & Volek PC

(57) ABSTRACT

A male masturbating apparatus includes an elongated hollow frame member and a flexible actuator mounted to the elongated hollow frame member. The flexible actuator is operable between a first position and a second position. A silicon element is mounted within the elongated hollow frame member. A plurality of sensors is configured to detect at least a depth information based on a level of insertion of a penis in a flexible opening of the silicon element, and a magnitude of force applied on the flexible actuator for operating the flexible actuator to the second position from the first position. A control unit is operatively coupled to the plurality of sensors. The control unit is configured to provide a vibrotactile output based at least on the depth information and the magnitude of force applied on the flexible actuator.

20 Claims, 11 Drawing Sheets

MALE MASTURBATING APPARATUS

CROSS REFERENCE TO RELATED APPLICATION

This application is a continuation of U.S. application Ser. No. 17/401,234, filed on Aug. 12, 2021, which is hereby incorporated by reference in its entirety.

TECHNICAL FIELD

The present disclosure relates to an apparatus for facilitating sexual pleasure and, more particularly relates, to a male masturbation apparatus.

BACKGROUND

Masturbation or self-sexual intercourse is a common activity among adults irrespective of gender, race, and so forth. Masturbation is generally referred to as stimulation of genital organs to obtain sexual pleasure.

Typically, male masturbation is often done with the hands or by using a suitable device (such as adult toys or sex toys) that causes friction and helps in achieving sexual pleasure. Mostly, the devices used by males for masturbation include a soft surrounding element having an orifice, in which a portion of male genitalia (i.e. penis) is inserted therein. Further, such devices are equipped with a motion generating mechanism for creating a vibrating motion to the portion of male genitalia to provide sexual pleasure. However, the conventional adult toys may not provide the same level of sexual pleasure at every instance due to limited controllable settings in the adult toys. Additionally, the arousals of the individual may change periodically based on mood and environment, thus the sexual pleasure produced by the conventional adult toys may not satisfy the individual.

In recent times, social media and the ability to extend wireless interfaces have enhanced the features of the adult toys. These technologies facilitate a level of customization to needs of the individual or a group of individuals (for example, the male and a female with corresponding adult toys). Further, these technologies require built-in sensors configured in the adult toys (i.e. the adult toy associated with the male) for determining parameters related to sexual behavior, mood, and arousal, and so forth to operate the adult toy of the female. However, in some cases, the sensors may not appropriately determine the parameters, thus leading to failure in providing desired sexual stimulus or arousal associated with masturbation.

Therefore, there is a need for a male masturbation aid to overcome one or more limitations stated above in addition to providing other technical advantages.

SUMMARY

Various embodiments of the present disclosure provide an apparatus for experiencing sexual pleasure.

In an embodiment, a male masturbating apparatus is disclosed. The male masturbating apparatus includes an elongated hollow frame member. The elongated hollow frame member includes a first end and a second end. The male masturbating apparatus includes a flexible actuator mounted to the elongated hollow frame member. The flexible actuator is operable between a first position and a second position. Further, the male masturbating apparatus includes a silicon element mounted within the elongated hollow frame member along a length extending from the first end to the second end of the elongated hollow frame member. The silicon element includes a flexible opening positioned proximate to the first end. The male masturbating apparatus includes a plurality of sensors housed within the elongated hollow frame member. The plurality of sensors is configured to detect at least a depth information based on a level of insertion of a penis of a user within the silicon element through the flexible opening, and a magnitude of force applied on the flexible actuator for operating the flexible actuator to the second position from the first position. The male masturbating apparatus further includes a control unit housed within the elongated hollow frame member and operatively coupled to the plurality of sensors. The control unit is configured to provide a vibrotactile output based at least on the depth information and the magnitude of force applied on the flexible actuator.

In another embodiment, a male masturbating apparatus is disclosed. The male masturbating apparatus includes an elongated hollow frame member. The elongated hollow frame member includes a first end and a second end. The male masturbating apparatus includes a flexible actuator mounted to the elongated hollow frame member. The flexible actuator is operable between a first position and a second position. Further, the male masturbating apparatus includes a silicon element mounted within the elongated hollow frame member along a length extending from the first end to the second end of the elongated hollow frame member. The silicon element includes a flexible opening positioned proximate to the first end. The male masturbating apparatus further includes a plurality of sensors. Each sensor of the plurality of sensors is aligned parallel to a vertical axis of the elongated hollow frame member. The plurality of sensors is configured to detect a depth information based on a level of insertion of a penis of a user within the silicon element through the flexible opening. The level of insertion of the penis within the silicon element is determined based at least on an operating status of the each sensor of the plurality of sensors to determine depth information. Further, the plurality of sensors is configured to detect a magnitude of force applied on the flexible actuator for operating the flexible actuator to the second position from the first position. The magnitude of force applied on the flexible actuator is detected based on sensing elastic deformation of the silicon element caused due to operating the flexible actuator to the second position from the first position. The male masturbating apparatus includes a control unit housed within the elongated hollow frame member and operatively coupled to the plurality of sensors. The control unit is configured to provide a vibrotactile output based at least on the depth information and the magnitude of force applied on the flexible actuator.

BRIEF DESCRIPTION OF THE FIGURES

The following detailed description of illustrative embodiments is better understood when read in conjunction with the appended drawings. For the purpose of illustrating the present disclosure, exemplary constructions of the disclosure are shown in the drawings. However, the present disclosure is not limited to a specific device or a tool and instrumentalities disclosed herein. Moreover, those in the art will understand that the drawings are not to scale. Wherever possible, like elements have been indicated by identical numbers.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Various embodiments of the present invention are described hereinafter with reference to FIG. 1 to FIG. 8.

Figure 1:
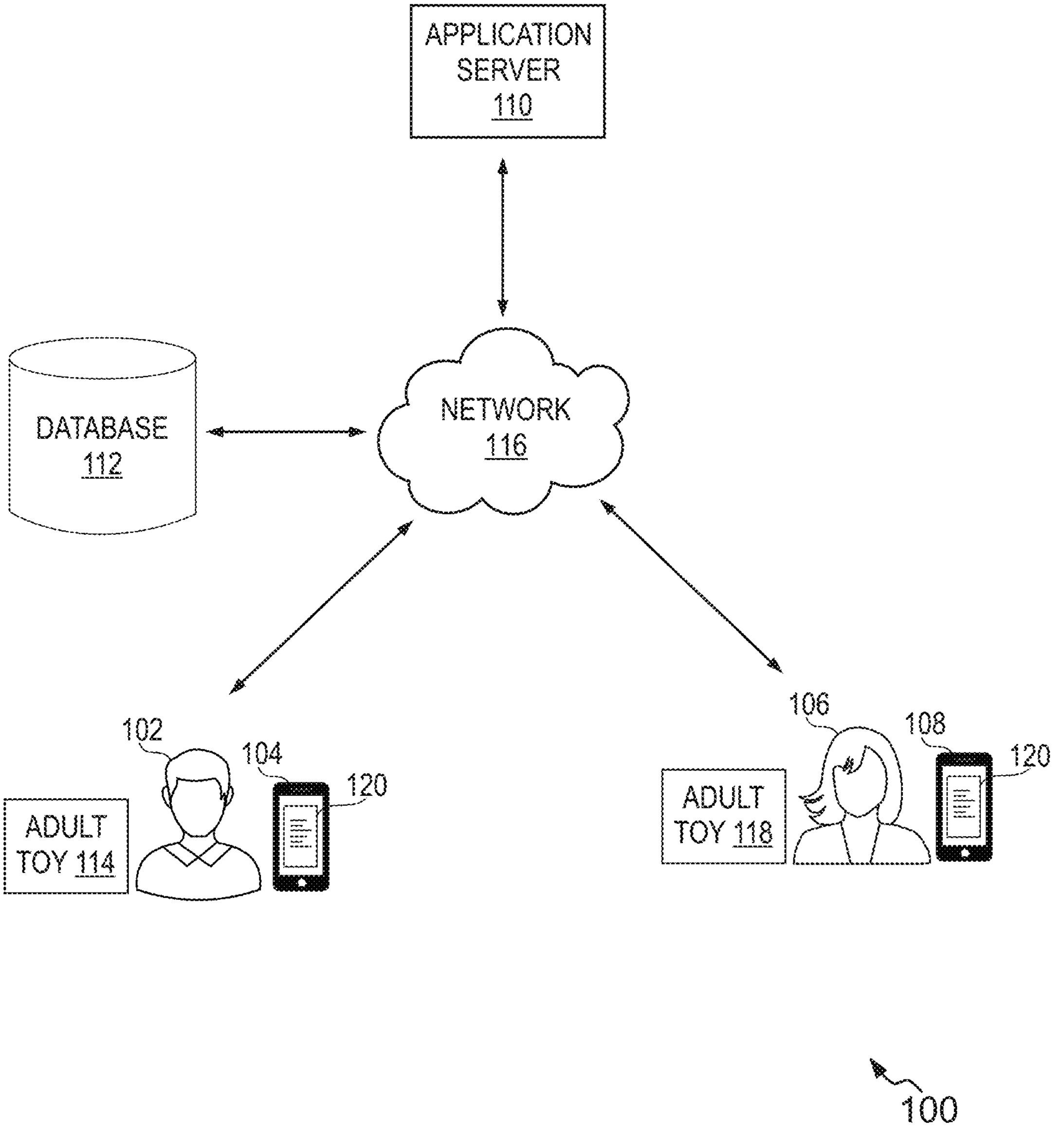
FIG. 1 illustrates an example representation of an environment related to at least some embodiments of the present disclosure.

FIG. 1 illustrates an example representation of an environment 100, in which at least some example embodiments of the present disclosure can be implemented. Although the environment 100 is presented in one arrangement, other arrangements are also possible where the parts of the environment 100 (or other parts) are arranged or interconnected differently. The environment 100 generally includes a user device 104 associated with a user 102, a user 106 associated with a user device 108, an application server 110, a database 112, each coupled to, and in communication with (and/or with access to) a network 116. Examples of the user devices 104 and 108 may include, without limitation, smart phones, tablet computers, other handheld computers, wearable devices, laptop computers, desktop computers, servers, portable media players, gaming devices, and so forth. Further, the environment 100 includes an adult toy 114 and an adult toy 118 associated with the user 102 and the user 106, respectively. The adult toy 114 associated with the user 102 (exemplary depicted to be a male user) may be a male masturbating apparatus. The adult toy 114 is hereinafter interchangeably referred to as "the male masturbating apparatus 114". Further, the adult toy 118 associated with the user 106 (exemplary depicted to be a female user) may be a female sex toy for example, a dildo with vibrating mechanism, a vibrator, and the like.

Various entities in the environment 100 may connect to the network 116 in accordance with various wired and wireless communication protocols, such as, Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof. In some instances, the network 116 may include a secure protocol (e.g., Hypertext Transfer Protocol (HTTP)), and/or any other protocol, or set of protocols. In an example embodiment, the network 116 may include, without limitation, a light fidelity (Li-Fi) network, a local area network (LAN), a wide area network (WAN) (e.g., the Internet), a mobile network, a virtual network, and/or another suitable public and/or private network capable of supporting communication among two or more of the entities illustrated in FIG. 1, or any combination thereof.

In one embodiment, the user devices 104 and 108 are equipped with an instance of an interactive application 120 (hereinafter interchangeably referred to as 'the application 120'). The application 120 is a set of computer executable codes configured to provide user interfaces (UIs) or virtual platform to the users 102 and 106 for enabling the users 102 and 106 located either in remote locations and/or present physically to experience sexual pleasure by using their corresponding adult toys (e.g., the adult toys 114 and 118, respectively). The application 120 may be hosted and managed by the application server 110. In an embodiment, the application server 110 may provide the application 120, in response to a request received from each of the user devices 104 and 108 via the network 116. In another embodiment, the application 120 may be factory-installed on the user devices 104 and 108. In another embodiment, each of the user devices 104 and 108 may access an instance of the application 120 from the application server 110 for installing on the user devices 104 and 108 using application stores associated with various operating systems such as Apple IOS®, Android™ OS, Google Chrome OS, Symbian OS®, Windows Mobile® OS, and the like.

It should be understood that the male masturbating apparatus 114 and the adult toy 118 are self-operated by the users 102 and 106 respectively, in order to explore one's body and achieve a satisfying masturbating experience or orgasm. Specifically, the user 102 may simply insert penis through an orifice configured in the male masturbating apparatus 114, so as to experience the sexual pleasure. Further, the structural configuration and operating modes associated with the male masturbating apparatus 114 are herein explained with reference to FIGS. 2A-2D and FIGS. 3A-3C. Additionally, the adult toys 114 and 118 may be connected wirelessly with the user devices 104 and 108, respectively, using short range communication protocols. Some non-limiting examples of the short range communication protocols are, Bluetooth, near field communication (NFC), wireless fidelity (Wi-Fi), and so forth.

The application server 110 managing the application 120 may be configured to receive parameters related to a depth information and a magnitude of force applied on a flexible actuator of the male masturbating apparatus 114, upon enabling the wireless connectivity between the user device 104 and the male masturbating apparatus 114. Specifically, the depth information and the magnitude of force applied on the flexible actuator may be computed and/or detected by built-in sensors of the male masturbating apparatus 114 and transmitted to the application 120. Thereafter, the application server 110 generates a control pattern based at least on the depth information and the magnitude of force applied on the flexible actuator and transmits to the user device 104 for operating the male masturbating apparatus 114.

Further, the user 102 may control the adult toy 118 associated with the user 106 located in a remote location by providing inputs related to the user 106 in the application 120. In this scenario, the application server 110 transmits the control pattern to the user 106 for operating the adult toy 118, thus enabling a sexual interaction between the user 106 and the user 102 without physical and/or direct contact. In one embodiment, the user 102 may select a predefined control pattern provided in the application 120 for controlling at least the male masturbating apparatus 114 and the adult toy 118. The predefined control pattern and the control pattern associated with the user 102 may be stored in the database 112 communicably coupled to the application server 110.

The number and arrangement of systems, devices, and/or networks shown in FIG. 1 are provided as an example. There may be additional systems, devices, and/or networks; fewer systems, devices, and/or networks; different systems, devices, and/or networks, and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of the environment 100 may perform one or more functions described as being performed by another set of systems or another set of devices of the environment 100.

Figure 2A:
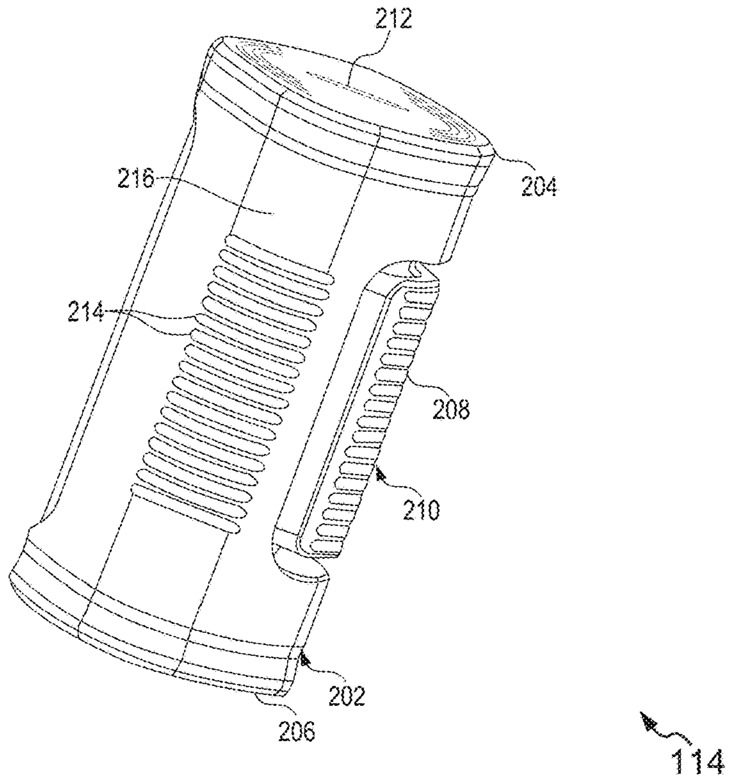
FIG. 2A is a top, left-side perspective view of a male masturbating apparatus, in accordance with an example embodiment of the present disclosure.
Figure 3A:
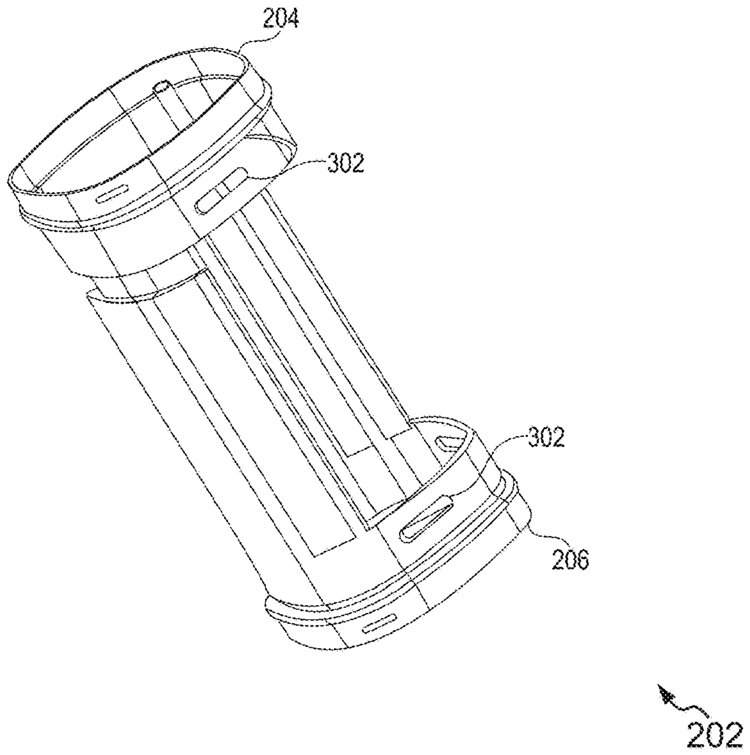
FIGS. 3A, 3B and 3C, collectively, illustrate perspective views of an elongated hollow frame member of the male masturbating apparatus, in accordance with an example embodiment of the present disclosure.
Figure 3B:
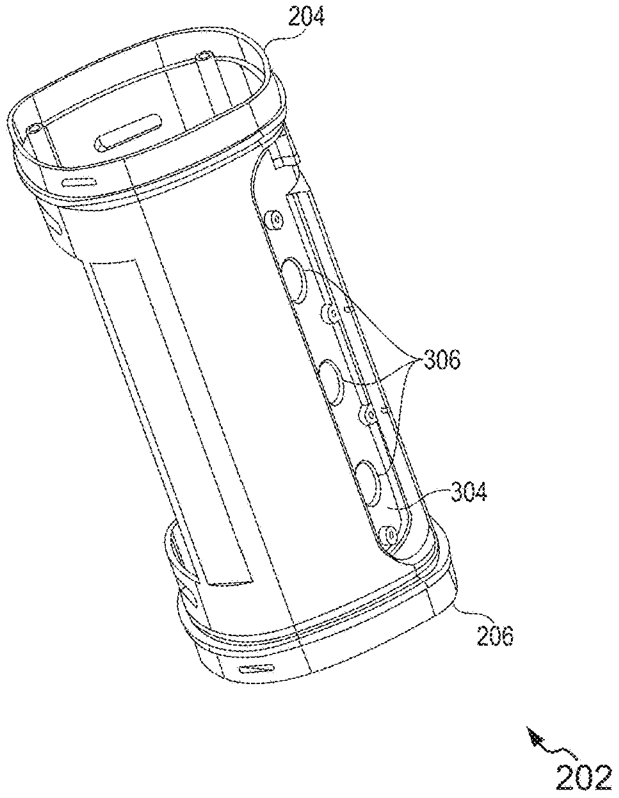

FIG. 2A is a top, left-side perspective view of the male masturbating apparatus 114, in accordance with an example embodiment of the present disclosure. As shown, the male masturbating apparatus 114 includes an elongated hollow frame member 202. The elongated hollow frame member 202 includes a first end 204 and a second end 206. The elongated hollow frame member 202 is a hollow cylindrical structure (as shown in FIG. 3A). The hollow cylindrical structure (or the elongated hollow frame member 202) is configured with dimensions based on an average size and length of a penis. The elongated hollow frame member 202 may be made of materials, but are not limited to, plastic, metal, rubber, and any combination thereof. Further, the elongated hollow frame member 202 may be made of a suitable manufacturing technique, such as extrusion, molding and so forth.

It should be noted that the first end 204 and the second end 206 are configured to be an open configuration and a close configuration, respectively (as shown in FIG. 3A). The open configuration of the first end 204 allows access therethrough into the elongated hollow frame member 202 and the closed configuration of the second end 206 precludes access into the elongated hollow frame member 202.

In an embodiment, the male masturbating apparatus 114 may include a cap (not shown in Figures) for openably closing the first end 204. In other words, the cap may be removed from the first end 204 for using the male masturbating apparatus 114, and after the use of the male masturbating apparatus 114, the first end 204 is closed with the cap. It should be understood that the second end 206 may also include the cap which may be integral or detachably coupled with the second end 206 for constituting the closed configuration thereof.

Further, the male masturbating apparatus 114 includes a flexible actuator 208 mounted to the elongated hollow frame member 202. Specifically, the elongated hollow frame member 202 includes a support structure (see, 308 of FIG. 3C) for enabling mounting of the flexible actuator 208 to the elongated hollow frame member 202 of the male masturbating apparatus 114. The flexible actuator 208 is configured to be operable between a second position (see, 226 of FIG. 2D) and a first position (see, 210 of FIG. 2A). In other words, the flexible actuator 208 is a squeeze button that may be pressed inwardly to direct the flexible actuator 208 axially relative to the elongated hollow frame member 202, for example, from the first position 210 to the second position 226. Further, the flexible actuator 208 may be operatively coupled to a control unit (see, 218 of FIG. 2B). As such, the control unit 218 operates the male masturbating apparatus 114 based on operating the flexible actuator 208 to the second position 226 which will be explained further in detail. It should be noted that the flexible actuator 208 and the control unit 218 are mounted at diametrically opposite sides in the male masturbating apparatus 114.

Figure 2B:
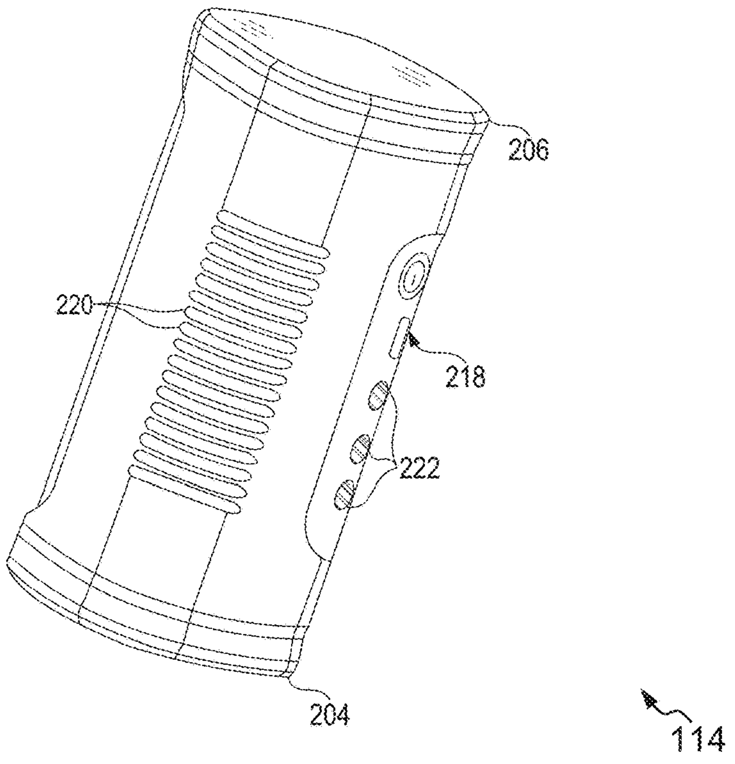
FIG. 2B is a bottom, right-side perspective view of the male masturbating apparatus, in accordance with an example embodiment of the present disclosure.
Figure 2C:
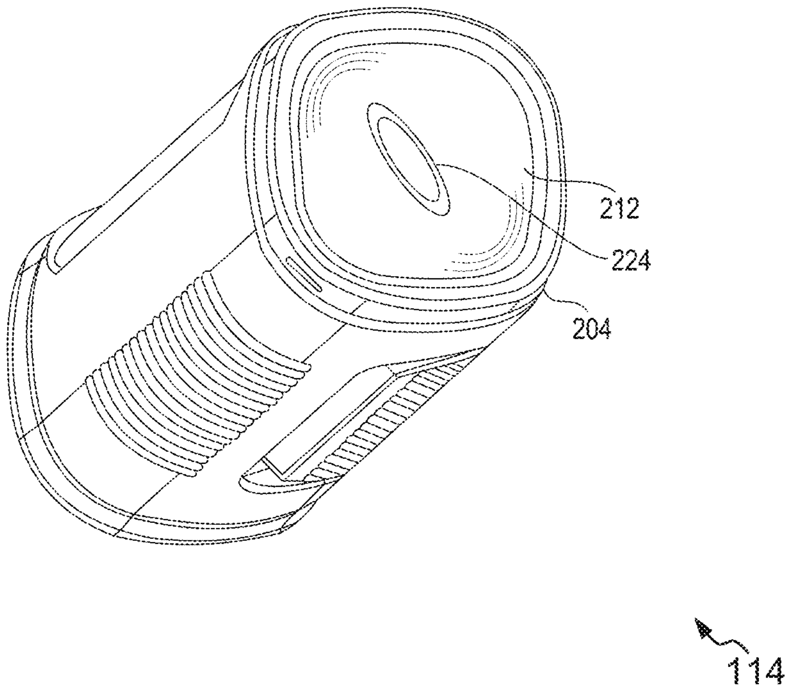
FIG. 2C is a top perspective view of the male masturbating apparatus, in accordance with an example embodiment of the present disclosure.
Figure 2D:
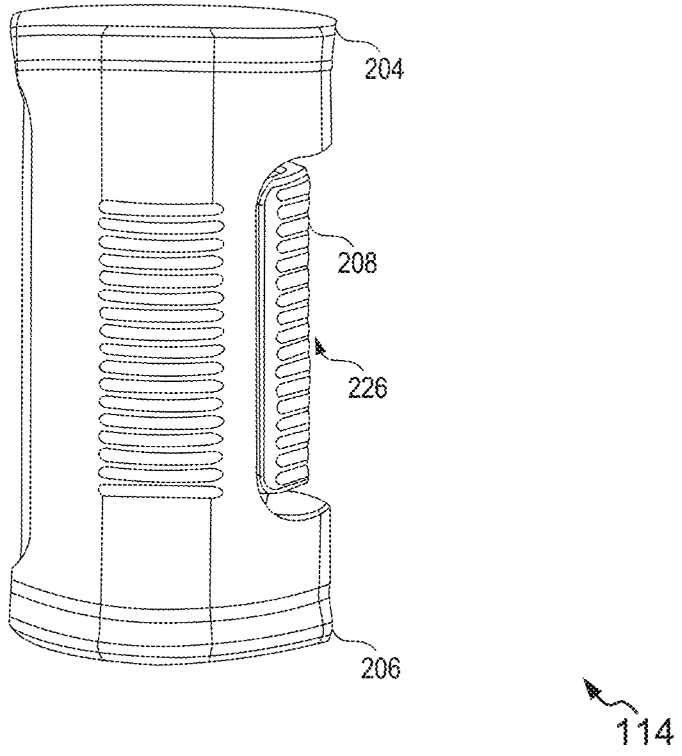
FIG. 2D is a perspective view of the male masturbating apparatus, depicting a flexible actuator of the male masturbating apparatus operated in a second position, in accordance with an example embodiment of the present disclosure.

The male masturbating apparatus 114 further includes a silicon element 212 mounted within the elongated hollow frame member 202 along a length extending from the first end 204 to the second end 206 of the elongated hollow frame member 202. As explained above, the first end 204 is configured to be the open configuration, for allowing access to the silicon element 212. The silicon element 212 includes a flexible opening (see, 224 of FIG. 2C) positioned proximate to the first end 204. The flexible opening 224 is configured to receive the penis of the user (e.g., the user 102). As shown in FIG. 2C, it is evident that the silicon element 212 conforms a shape of a female genitalia (or a vagina). It should be understood that the silicon element 212 is configured to have the shape of the vagina for creating desired sexual stimulus or arousal for the user 102 while masturbating using the male masturbating apparatus 114. In an embodiment, the silicon element 212 may be configured to have a shape of an anus. It is obvious that the silicon element 212 is made of silicon, however, the silicon element 212 may be made of any other suitable flexible material.

Further, a size of the flexible opening 224 of the silicon element 212 is based on accommodating a diametrical size of the penis of the user (e.g., the user 102). It is to be understood that the size of the flexible opening 224 of the silicon element 212 has to be such that it can receive therethrough penises of various sizes. Typically, the silicon element 212 is configured to be a flexible and expandable configuration, adapted to adjustably contact and surround the penis based on the size thereof. In an example embodiment, the male masturbating apparatus 114 may be provided with multiple silicon elements, such as the silicon element 212, each having different size of the flexible opening 224 to accommodate varying diametrical size of the penis. In this scenario, the silicon element 212 may be detachably mounted within the elongated hollow frame member 202 through the first end 204. The silicon element 212 is configured to undergo elastic deformation for providing masturbating experience to the user (e.g., the user 102). The elastic deformation for providing the masturbating experience is generated based on detection of at least the magnitude of force applied on the flexible actuator 208 and the depth information by the control unit 218 which is further explained in detail.

Figure 3C:
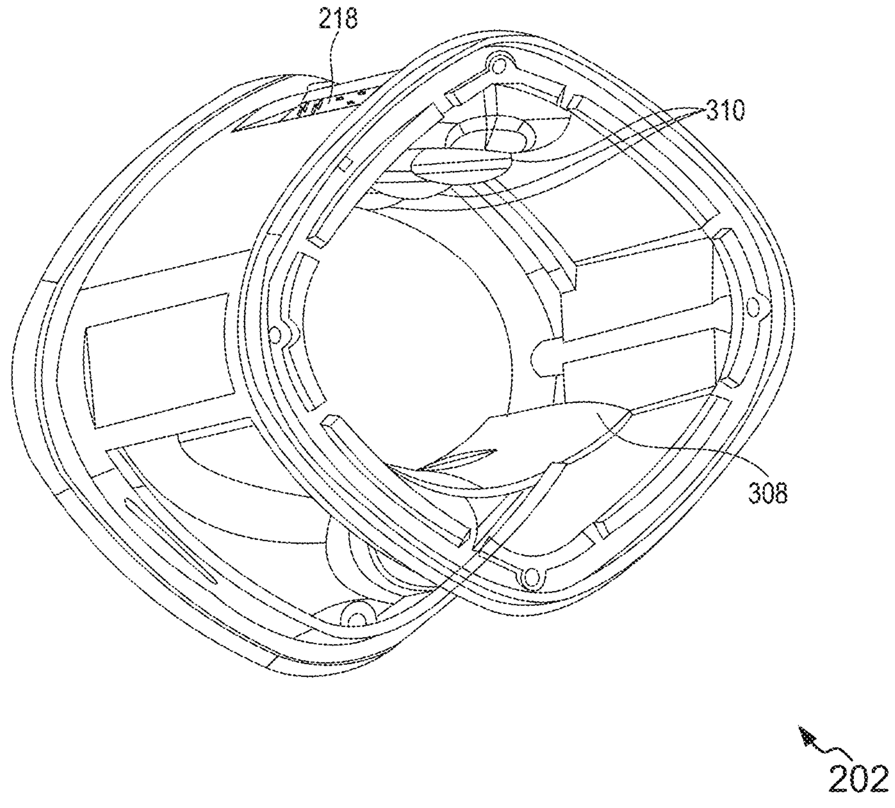

The control unit 218 includes suitable electronic circuitry (not shown in Figures) housed within the elongated hollow frame member 202. The male masturbating apparatus 114 further includes a plurality of sensors (see, 310 of FIG. 3C). Typically, the sensors 310 are designed on a printed circuit board (PCB) (not shown in Figures) of the control unit 218. Further, the male masturbating apparatus 114 includes a cut-out portion (see, 304 of FIG. 3B). The cut-out portion 304 is configured with a plurality of orifices (see, 306 of FIG. 3B). Thus, the control unit 218 is assembled in the cut-out portion 304 by passing the sensors 310 through the orifices 306 (as shown in FIG. 3C). It should be understood that the number of sensors such as the sensors 310 depend on the number of orifices 306 configured in the elongated hollow frame member 202.

It is evident from FIGS. 3C and 3D that each sensor of the sensors 310 housed within the elongated hollow frame member 202 is aligned parallel to a vertical axis X-X' of the elongated hollow frame member 202. The sensors 310 are configured to determine the users' movement. In particular, the sensors 310 are pressure sensors that are configured to detect at least the depth information based on a level of insertion of the penis of the user (e.g., the user 102) within the silicon element 212. The level of insertion of the penis within the silicon element 212 is determined based on an operating status of at least one sensor among the sensors 310. It will be apparent that each sensor 310 is associated with a particular depth information. For instance, the male masturbating apparatus 114 may include three sensors (i.e. the sensors 310). In one example scenario, if only one sensor among the three sensors 310 detects the pressure information, the depth information associated with the level of insertion of the penis within the silicon element 212 corresponds to a low depth. In another example scenario, if two sensors among the three sensors 310 detect the pressure information, the depth information associated with the level of insertion of the penis within the silicon element 212 corresponds to an intermediate depth. In yet another example scenario, if all the sensors 310 detect the pressure information, the depth information associated with the level of insertion of the penis within the silicon element 212 corresponds to a high depth.

Further, the sensors 310 detecting the pressure information based on the level of insertion of the penis within the silicon element 212 to determine the depth information corresponds to the operating status of the sensors 310. The operating status of each sensor 310 is indicated using light emitting diodes (LEDs) (see, 222 of FIG. 2B). For instance, if one sensor detects the pressure information, one LED is turned ON to indicate the operating status. It is obvious that the number of LEDs 222 depends upon the number of sensors 310 designed in the control unit 218.

In addition, the sensors 310 are configured to detect the magnitude of force applied on the flexible actuator 208 for operating the flexible actuator 208 to the second position 226 from the first position 210. More specifically, upon insertion of the penis within the silicon element 212, the user 102 presses the flexible actuator 208 inwardly to direct the flexible actuator 208 to the second position 226 from the first position 210. The flexible actuator 208 operated to the second position 226 generates elastic deformation. As such, the sensors 310 detect the magnitude of force applied on the flexible actuator 208 based on sensing the impact on the silicon element 212 due to elastic deformation caused by operating the flexible actuator 208 to the second position 226 from the first position 210.

The control unit 218 accesses the depth information and the magnitude of force applied on the flexible actuator 208 detected by the sensors 310 to operate the male masturbating apparatus 114 in order to provide sexual pleasure to the user 102. More specifically, upon insertion of the penis within the silicon element, the user 102 may operate the flexible actuator 208 to the second position 226. In this scenario, the control unit 218 operates the male masturbating apparatus 114 to provide a vibrotactile output for enabling the user 102 to experience the sexual stimulus or masturbating experience. In particular, the male masturbating apparatus 114 may include a motion generating mechanism, such as a vibrating motor (not shown in Figures) operable to create a vibrating motion or provide vibrotactile output, for enabling the user 102 to experience sexual stimulation while masturbating.

Further, an intensity of the vibrotactile output produced by the male masturbating apparatus 114 is based at least on the depth information and the magnitude of force applied on the flexible actuator 208.

As explained above, the depth information is represented as the low depth, medium depth and high depth based on the level of insertion of the penis within the silicon element 212. Thus, the control unit 218 facilitates the male masturbating apparatus 114 to provide the vibration intensity (or the vibrotactile output) based on the depth information or the level of insertion of the penis within the silicon element 212. For instance, if the depth information is higher (e.g., high depth), the male masturbating apparatus 114 is to provide higher masturbating speed (i.e. higher vibration intensity). Additionally, the control unit 218 may control the vibrotactile output at various stages during the masturbating process based on the user preference. In one example scenario, the level of insertion of the penis in the silicon element 212 may be varied while masturbating based on the user preference. In such scenario, the control unit 218 adapts the masturbating speed based on detection of change in the depth information (e.g., from high depth to medium depth) at various stages during the masturbating process. This allows the user 102 to experience enhanced sexual pleasure and satisfying masturbating experience throughout the masturbating process.

Further, the intensity of the vibrotactile output is altered based on the magnitude of force applied on the flexible actuator 208 (e.g., the squeeze button) for operating the flexible actuator 208 to the second position 226 from the first position 210. It will be apparent that the user 102 has to grasp the male masturbating apparatus 114 in hand and press the flexible actuator 208 with help of the hand for operating the flexible actuator 208 to the second position 226. The male masturbating apparatus 114 includes a first antiskid part (see, 214 of FIG. 2A) and a second antiskid part (see, 220 of FIG. 2B) mounted to the elongated hollow frame member 202 for enhancing grip of the male masturbating apparatus 114 to the user during use. Further, the second position 226 is referred to as movement of the flexible actuator 208 axially at any distance relative to the elongated hollow frame member 202. Thus, it is obvious that the flexible actuator 208 is operated to multiple second positions based on the magnitude of force applied on the flexible actuator 208. Further, it is to be understood that the flexible actuator 208 is configured with a threshold flexibility which inhibits further movement of the flexible actuator 208 axially relative to the elongated hollow frame member 202.

The control unit 218 is configured to alter the vibration intensity (or the vibrotactile output) of the male masturbating apparatus 114 based on the magnitude of force applied on the flexible actuator 208. For instance, if the user 102 squeezes the flexible actuator 208 harder, the sensors 310 will detect more pressure (i.e. the magnitude of force applied on the flexible actuator 208 is higher), thus the control unit 218 operates the male masturbating apparatus 114 to cause a higher intensity of vibration. Similar to the depth information, the control unit 218 may also control the vibrotactile output at various stages during the masturbating process based on the user preference. In one example scenario, the magnitude of force applied on the flexible actuator 208 may be varied by the user 102 while masturbating. In such scenario, the control unit 218 adapts the masturbating speed based on detection of magnitude of force applied on the flexible actuator 208 at various stages during the masturbating process. This allows the user 102 to experience enhanced sexual pleasure and satisfying masturbating experience throughout the masturbating process.

In an embodiment, the male masturbating apparatus 114 is provided with a casing (see, 216 of FIG. 2A) to enhance aesthetic appeal of the male masturbating apparatus 114. Specifically, the casing 216 is mounted to slots (see, 302 of FIG. 3A) configured in the elongated hollow frame member 202. It is to be understood that the casing 216 is mounted to the elongated hollow frame member 202 using snap-fit arrangement. The casing 216 may be made of materials such as, but not limited to, plastic of low tensile strength, acrylic, plexi glass, metal, and the like. Further, the first antiskid part 214 and the second antiskid part 220 may also be made of plastic, plexi glass, and the like. As shown in FIGS. 2A and 2B, the first antiskid part 214 and the second antiskid part 220 are provided with indentations which enhances the grip of the male masturbating apparatus 114 to the user 102 during use. The first antiskid part 214 and the second antiskid part 220 are mounted at diametrically opposite sides in the male masturbating apparatus 114.

In addition, the male masturbating apparatus 114 may include wireless communication interface for communicating with a remote device (such as, the user device 104). In such scenario, the male masturbating apparatus 114 may be controlled by the user device 104 based on enabling the wireless communication with the user device 104. Further, the user 102 may also have sexual interaction with other user by using the male masturbating apparatus 114, upon enabling the wireless connection with the user device 104 which will be explained further with reference to FIG. 4.

Figure 4:
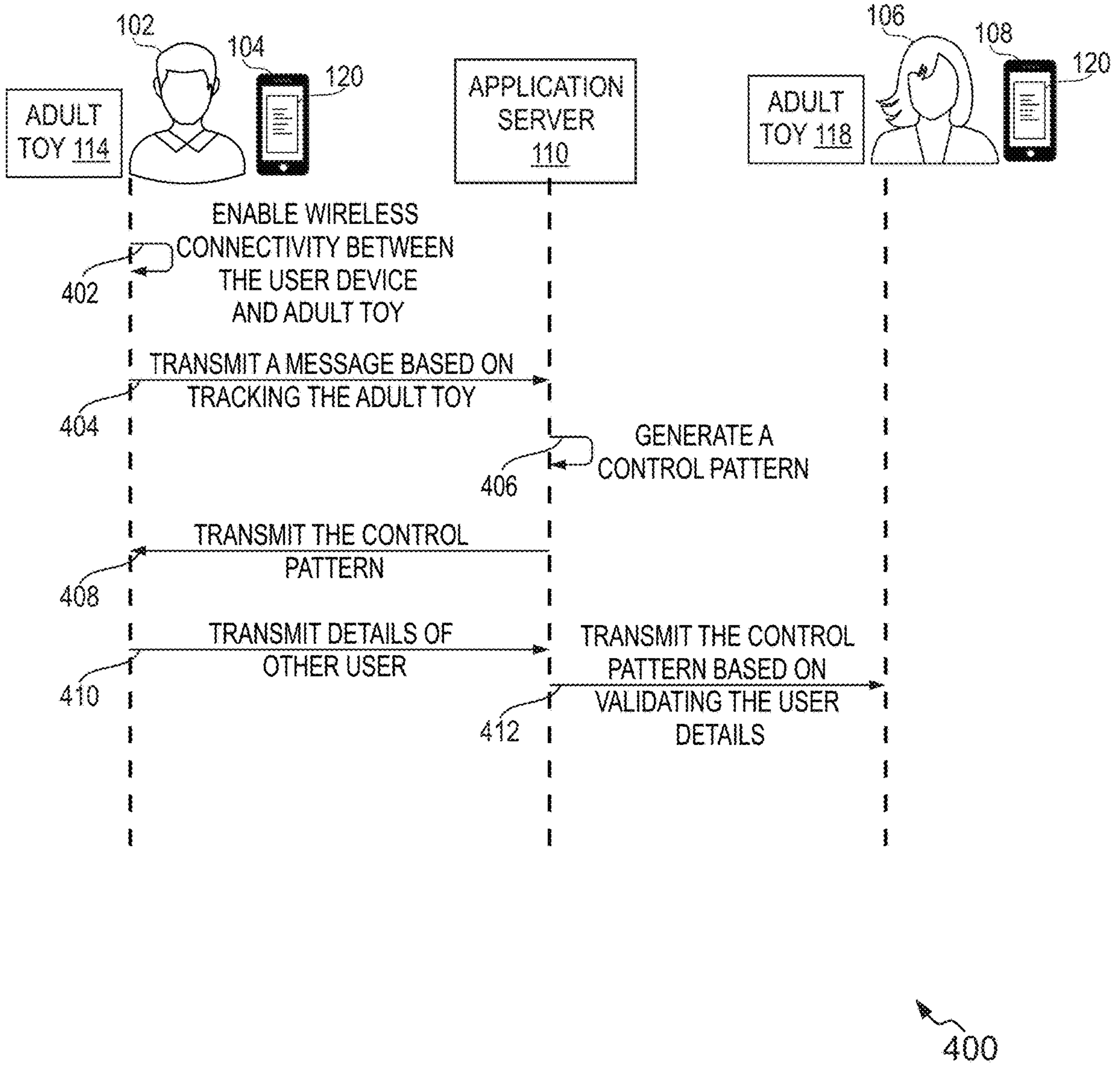
FIG. 4 illustrates a sequence flow diagram for enabling a user to interact with other user located in remote location through an interactive application to experience sexual stimulus, in accordance with an example embodiment of the present disclosure.

FIG. 4 illustrates a sequence flow diagram 400 for enabling the user 102 to interact with the other user such as the user 106 of the application 120 located in remote location, in accordance with an example embodiment of the present disclosure. For example, the user 102 may be located in a city A and the user 106 may be located in a city B may interact through the application 120 for experiencing sexual pleasure without physical contact. As shown, the user 102 (exemplary depicted to be the male user) is associated with the male masturbating apparatus 114 and the user 106 (exemplary depicted to be the female user) is associated with the female sex toy or the adult toy 118, for example, dildo, vibrator and the like.

At 402, the user 102 enables the wireless connectivity between the user device 104 and the male masturbating apparatus 114 using the short range communication protocols, for example, Bluetooth. This allows the application 120 installed in the user device 104 to track and control the operation of the male masturbating apparatus 114.

At 404, the application 120 installed in the user device 104 transmits a message to the application server 110 via the network 116 based on tracking the operation of the male masturbating apparatus 114. The message includes either the depth information or the magnitude of force applied on the flexible actuator 208, or the combination thereof. Specifically, the control unit 218 transmits the users' movement i.e. at least the depth information and the magnitude of force applied on the flexible actuator 208 detected by the sensors 310 to the application 120, upon enabling the wireless communication. The parameters defines the intensity of the vibrotactile output as explained above. Based on receipt of the parameters, the application 120 may encrypt the parameters, create the message and transmit the message to the application server 110.

At 406, the application server 110 generates the control pattern based at least on the decrypting the encrypted information in the message received from the user device 104. It should be understood that the application server 110 adjusts the intensity of the vibrotactile output based at least on the message to create the control pattern. Thereafter, the application server 110 transmits the control pattern to the application 120 installed in the user device 104 (see, 408). As such, the user 102 may access the control pattern in the application 120 to operate the male masturbating apparatus 114 in the control pattern's way for experiencing the sexual stimulus.

Additionally, the user 102 may wish to communicate with the user 106 and operate the adult toy 118 associated with the user in the control patterns' way of the user 102, in order to facilitate the user 106 to experience the sexual pleasure. At 410, the application 120 may transmit the details associated with the other user (e.g., the user 106) based on providing user inputs in the application 120, for operating the adult toy 118 associated with the user 106. At 412, the application server 110 transmits the control pattern associated with the user 102 to the user device 108 of the user 106 based on validating the details of the user 108. Specifically, the application server 110 may access a database such as the database 112 for retrieving the control pattern associated with the user 102 and transmit the control pattern to the user 106. This allows the user 106 to operate the adult toy 118 in the control pattern's way created by the user 102. To that effect, the user 106 at the remote location experiences the sexual stimulus or orgasm based on sensing the vibrotactile output provided by the adult toy 118 when operated in the control patterns' way.

In an embodiment, the control pattern created by the user 102 and stored in the database 112 is made available to all the users (e.g., the user 106) of the application 120. This allows any user (e.g., the user 106) of the application 120 to access each other's control pattern for experiencing the sexual stimulation by operating their corresponding adult toys in the control pattern's way.

Figure 5A:
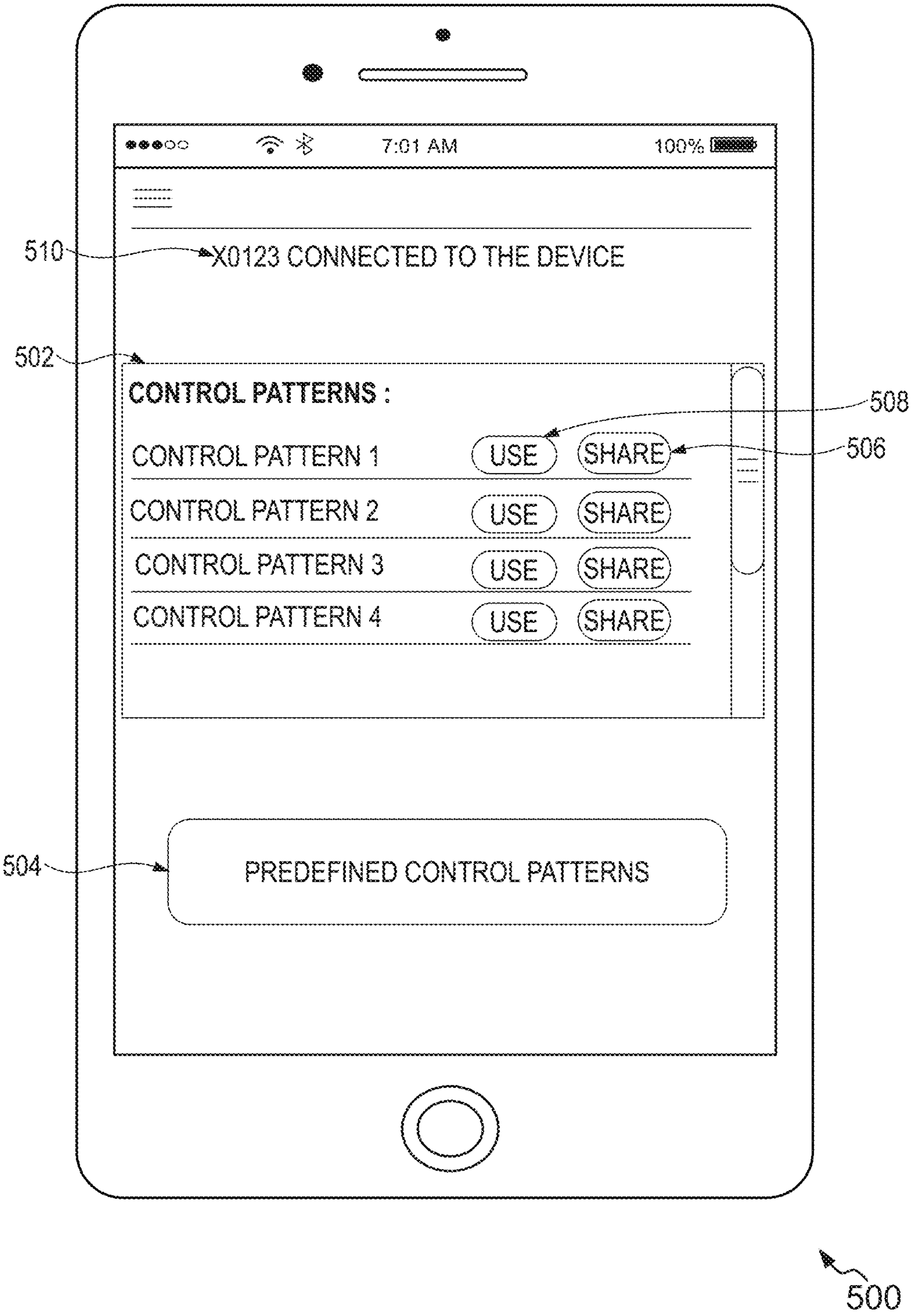
FIGS. 5A, and 5B collectively, represent example representations of user interfaces (UIs) displayed to the user in the interactive application to operate the male masturbating apparatus and interact with the other user of the interactive application, in accordance with an embodiment of the present disclosure.
Figure 5B:
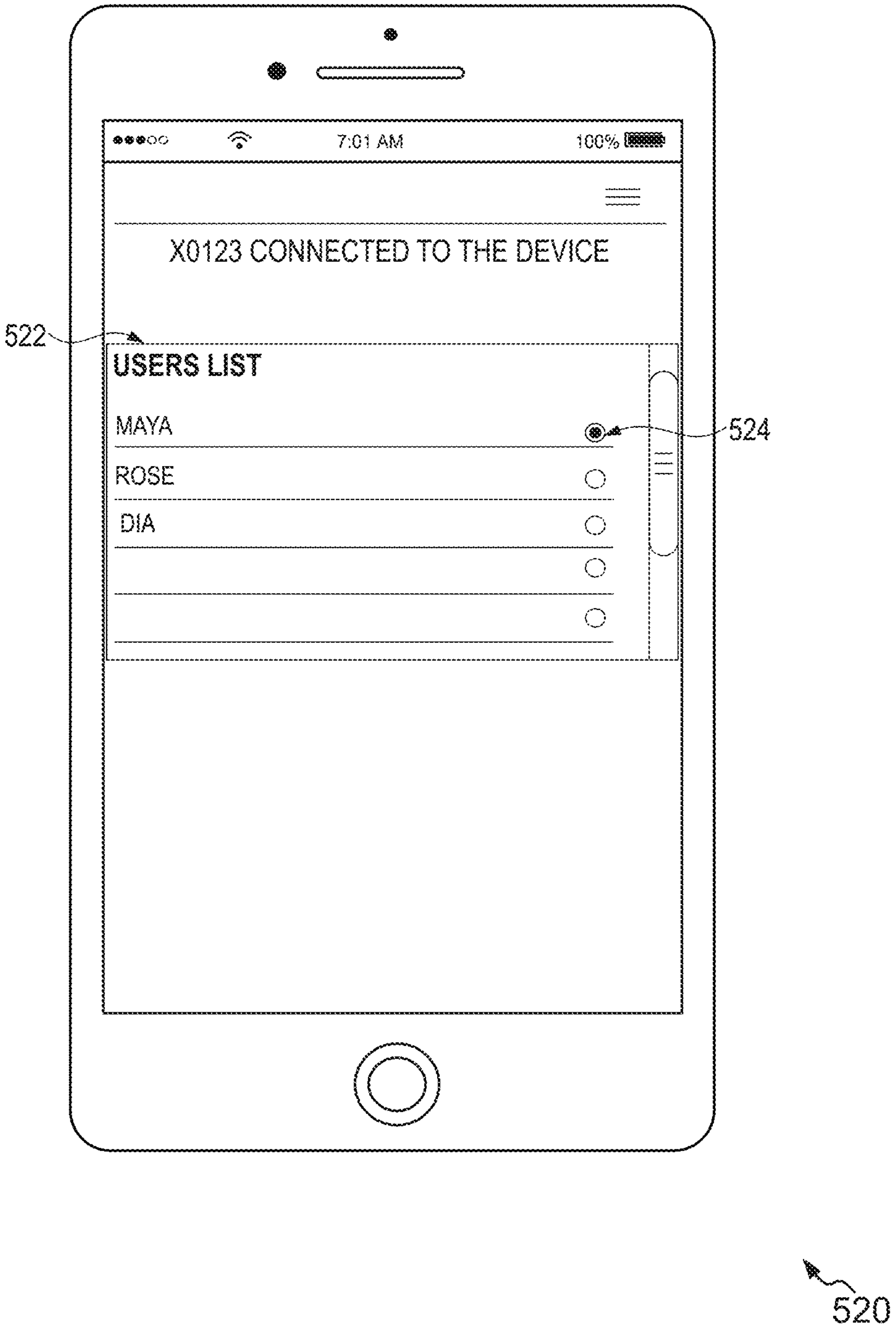

FIGS. 5A, and 5B collectively, represent example representation of user interfaces (UIs) displayed to the user (e.g., the user 102) in the interactive application 120 to operate the male masturbating apparatus 114 and interact with the other user such as the user 106, in accordance with an embodiment of the present disclosure.

Referring to FIG. 5A, a representation of a user interface (UI) 500 is depicted in the application 120. As shown, the UI 500 is depicted to include a list of control patterns 502 (exemplarily depicted to be 'CONTROL PATTERN 1', 'CONTROL PATTERN 2', and 'CONTROL PATTERN 3'). As explained above, each control pattern from the list of control patterns 502 is generated by the application server 110 based at least on the encrypted information (i.e. the depth information, the magnitude of force applied on the flexible actuator 208, or the combination thereof) in the message. The user 102 may select the control pattern, for example, 'control pattern 1' from the list of control patterns 502 by providing input on a button 508, for operating the male masturbating apparatus 114 to experience the sexual pleasure. It is to be noted that the UI 500 is depicted to include a connectivity status 510 (exemplarily depicted to be "X0123 connected to the device"). It should be understood that "X0123" represents a unique identifier associated with the male masturbating apparatus 100. The unique identifier may be stored in the application server 110.

In an embodiment, the user 102 may access predefined control patterns provided by the application 120 by providing input on a button 504 associated with the text "PREDEFINED CONTROL PATTERNS". The user 102 may be directed to a UI (not shown in Figures) depicting a list of predefined control patterns offered by the application 120. The user 102 may select a predefined control pattern from the list to operate the male masturbating apparatus 114.

Further, the user 102 may operate the adult toy 118 associated with the user 106 by sharing the control pattern created by the user 102. The user 102 may provide input on a button 506 associated with each control pattern in the list of control patterns 502 for sharing the control pattern to other users of the application 120. The button 506 is associated with the text "SHARE". For instance, the user 102 may select the "control pattern 2" by providing input on the button 506. Based on selection of the control pattern, the user 102 is prompted with a UI 520 depicting a list of users 522 (exemplarily depicted to be "MAYA", "ROSE", and "DIA") of the application 120 (as shown in FIG. 5B). It should be understood that the users depicted in the list of users 522 are connected with the user 102 in the application 120. The user 102 may select a user from the list of users 522 by providing inputs on a radio button 524 (as shown in FIG. 5B). This allows the user 102 to transmit the control pattern to other user (e.g., the user 106) of the application 120 to operate the adult toy 118 associated with the user 106 as explained above.

Figure 6:
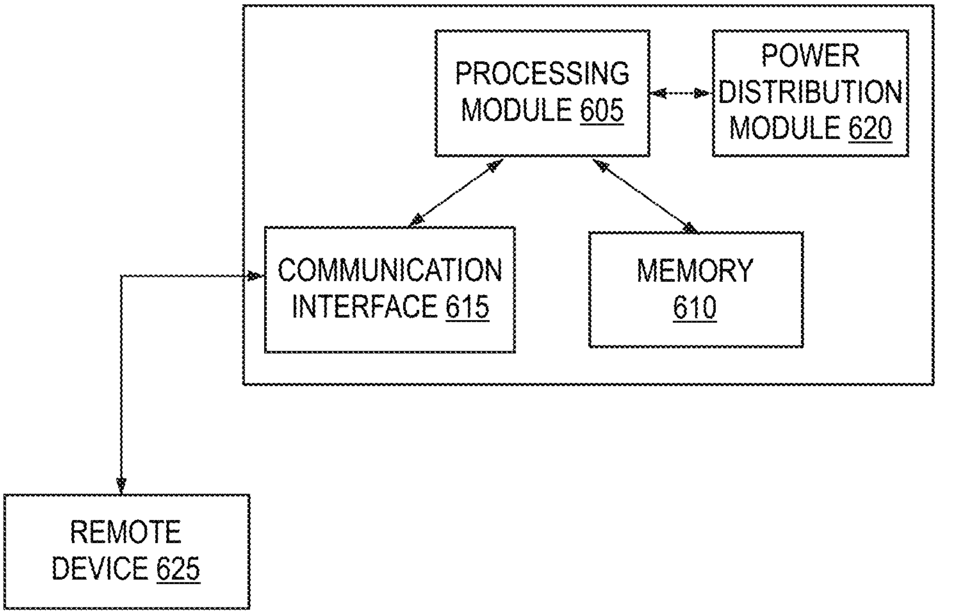
FIG. 6 illustrates a simplified block diagram representation of a control unit of the male masturbating apparatus, in accordance with an example embodiment of the present disclosure.

FIG. 6 illustrates a simplified block diagram representation of a control unit 600 of the male masturbating apparatus 114, in accordance with an example embodiment of the present disclosure. The control unit 600 is an example of the control unit 218 as explained with reference to FIG. 2B. The control unit 600 includes at least one processing module 605, a memory 610, a communication interface 615, and a power distribution module 620.

It is noted that although the control unit 600 is depicted to include only one processing module, the control unit 600 may include more number of processors therein. In an embodiment, the memory 610 is capable of storing executable instructions. Further, the processing module 605 is capable of executing the platform instructions to perform the operations described herein. In an embodiment, the processing module 605 may be embodied as a multi-core processor, a single core processor, or a combination of one or more multi-core processors and one or more single core processors.

The memory 610 may be embodied as one or more volatile memory devices, one or more non-volatile memory devices, and/or a combination of one or more volatile memory devices and non-volatile memory devices. Examples of the memory 610 include a random-access memory (RAM), a read-only memory (ROM), a removable storage drive, and the like. In at least some embodiments, the memory 610 stores instructions for enabling the processing module 605 to monitor signals from various circuitry of the male masturbating apparatus 114 and operate the male masturbating apparatus 114 for providing the vibrotactile output.

The power distribution module 620 includes suitable logic and circuitry for managing the power supply to the control unit 600 and other components of the male masturbating apparatus 114 for operating the apparatus 114. More specifically, the power distribution module 620 is communicably coupled to a battery (not shown in Figures) of the male masturbating apparatus 114. The power distribution module 620 is configured to supply power to each of the components of the apparatus 114 upon powering on the apparatus 114 (or operating the flexible actuator 208), for operating the male masturbating apparatus 114.

The processing module 605 is configured to operate the apparatus 114 based at least on the receipt of either the depth information or the magnitude of force applied on the flexible actuator 208 or both, from the sensors 310. Thereafter, the processing module 605 is configured to operate the vibrating motor (not shown in Figures) of the male masturbating apparatus 114 to provide the vibrotactile output. Additionally, the processing module 605 is configured to communicate with a remote device 625, for example, the user device 104 and the application server 110 via the communication interface 615 to transmit the message and receive the control pattern as explained above. Further, the one or more steps performed by the control unit 600 are already explained above, and therefore they are not reiterated herein, for the sake of brevity.

Figure 7:
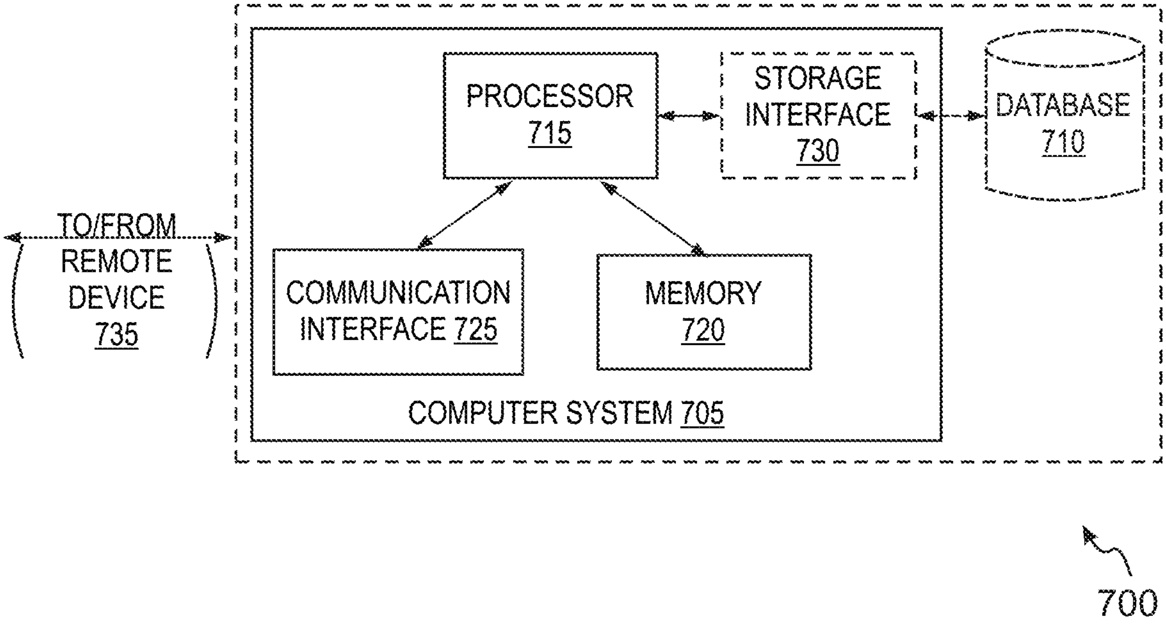
FIG. 7 is a simplified block diagram of an application server managing the interactive application, in accordance with one embodiment of the present disclosure.

FIG. 7 is a simplified block diagram of an application server 700, in accordance with one embodiment of the present disclosure. The application server 700 is an example of the application server 110 of FIG. 1. The game application server 700 may be a separate part, and may operate apart via the network 116 (as shown in FIG. 1). The game application server 700 is configured to host and manage the interactive application 120. The application server 700 includes a computer system 705 and a database 710.

The computer system 705 includes at least one processor 715 for executing instructions, Instructions may be stored in, for example, but not limited to, a memory 720. The processor 715 may include one or more processing units (e.g., in a multi-core configuration). The processor 715 is operatively coupled to a communication interface 725 such that the computer system 705 is capable of communicating with a remote device 735 such as the application 120, user devices 104 and 108, and the like. For example, the communication interface 725 may receive the message from the male masturbating apparatus 114, transmit the control pattern, and the like.

The processor 715 may also be operatively coupled to the database 710. The database 710 is any computer-operated hardware suitable for storing and/or retrieving data, such as, but not limited to, a list of user profiles (e.g., the users 102 and 106) of the application 120, a control pattern associated with each user, predefined control patterns, and the like.

In some embodiment, the database 710 is integrated within the computer system 705. For example, the database 710 may include multiple storage units such as hard disks and/or solid-state disks in a redundant array of inexpensive disks (RAID) configuration. The database 710 may include a storage area network (SAN) and/or a network attached storage (NAS) system. In some embodiments, the database 710 is integrated within the computer system 705. For example, the computer system 705 may include one or more hard disk drives as the database 710. In other embodiments, the database 710 is external to the computer system 705 and may be accessed by the computer system 705 using a storage interface 730. The storage interface 730 is any component capable of providing the processor 715 with access to the database 710. The storage interface 730 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 715 with access to the database 710.

The processor 715 of the computer system 705 is configured to receive the message including at least the depth information and the magnitude of force applied on the flexible actuator 208 from the control unit 600. Thereafter, the processor 715 is configured to generate the control pattern based on the information in the message, and transmit the control pattern to the user 102 for operating the male masturbating apparatus 114. The control pattern associated with each user may be stored in the database 710. Further, the server 700 is configured to transmit the control pattern associated with the user 102 to the user 106 for operating the adult toy 118 of the user 106 based at least on receipt of the user inputs related to the user 106 in the application 120 installed in the user device 104. Further, the functionalities associated with the application server 700 are explained above, and therefore they are not reiterated herein, for the sake of brevity.

Figure 8:
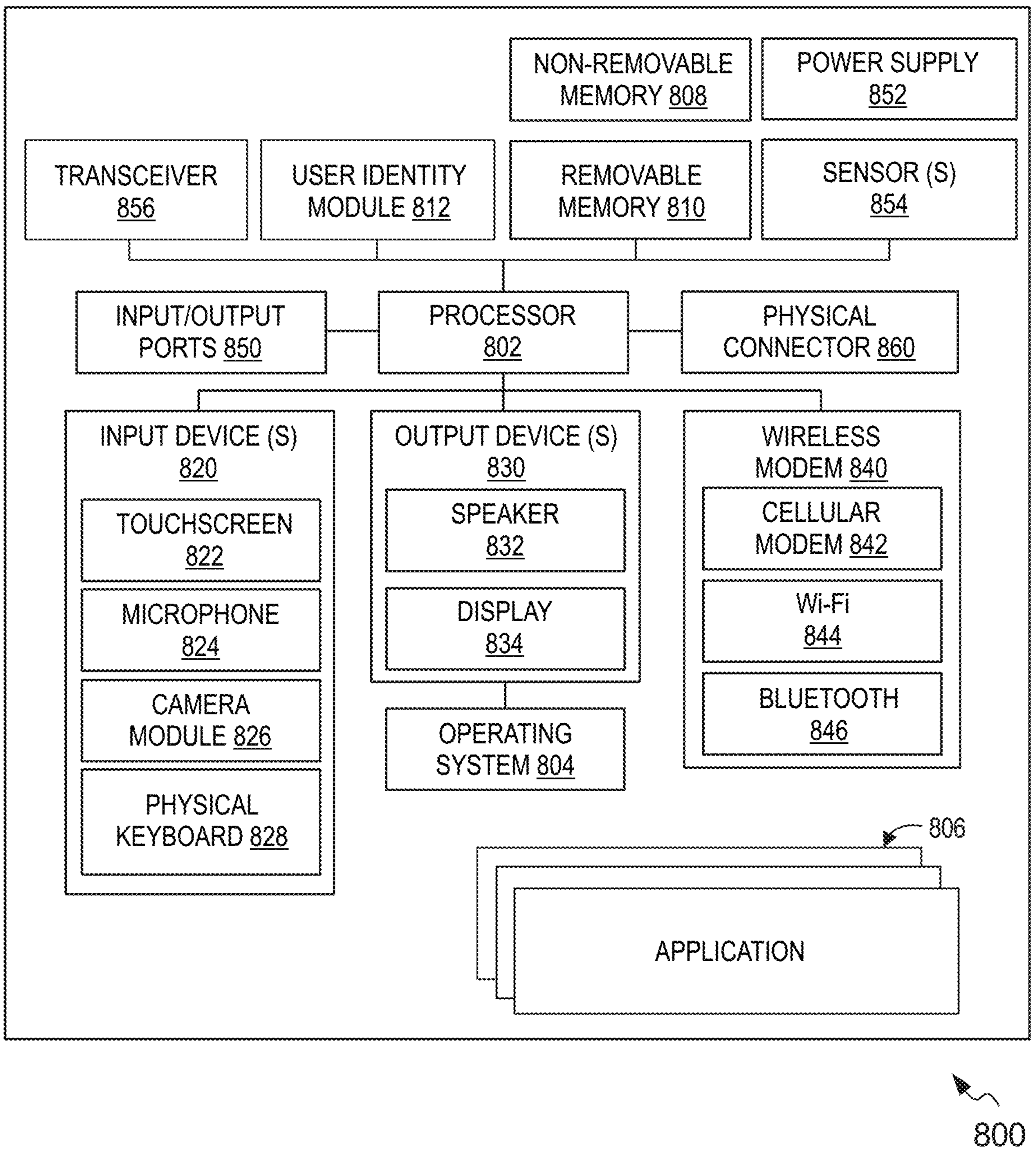
FIG. 8 is a simplified block diagram of an electronic device capable of implementing various embodiments of the present disclosure.

FIG. 8 is a simplified block diagram of an electronic device 800 capable of implementing various embodiments of the present disclosure. For example, the electronic device 800 may correspond to the user devices 104 and 108 of FIG. 1. The electronic device 800 is depicted to include one or more applications 806. For example, the one or more applications 806 may include the application 120 of FIG. 1. The application 120 can be an instance of an interactive application downloaded from the application server 110 or the application server 700. One of the one or more applications 806 installed on the electronic device 800 are capable of communicating with an application server for enabling sexual interaction between the users of the application 120 without direct/physical contact.

It should be understood that the electronic device 800 as illustrated and hereinafter described is merely illustrative of one type of device and should not be taken to limit the scope of the embodiments. As such, it should be appreciated that at least some of the components described below in connection with the electronic device 800 may be optional and thus in an embodiment may include more, less or different components than those described in connection with the embodiment of the FIG. 8. As such, among other examples, the electronic device 800 could be any of a mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 800 includes a controller or a processor 802 (e.g., a signal processor, microprocessor, ASIC, or other control and processing logic circuitry) for performing such tasks as signal coding, data processing, image processing, input/output processing, power control, and/or other functions. An operating system 804 controls the allocation and usage of the components of the electronic device 800 and supports for one or more operations of the application (see, the applications 806), such as the application 120 that implements one or more of the innovative features described herein. In addition, the applications 806 may include common mobile computing applications (e.g., telephony applications, email applications, calendars, contact managers, web browsers, messaging applications) or any other computing application.

The illustrated electronic device 800 includes one or more memory components, for example, a non-removable memory 808 and/or removable memory 810. The non-removable memory 808 and/or the removable memory 810 may be collectively known as a database in an embodiment. The non-removable memory 808 can include RAM, ROM, flash memory, a hard disk, or other well-known memory storage technologies. The removable memory 810 can include flash memory, smart cards, or a Subscriber Identity Module (SIM). The one or more memory components can be used for storing data and/or code for running the operating system 804 and the applications 806. The electronic device 800 may further include a user identity module (UIM) 812. The UIM 812 may be a memory device having a processor built in. The UIM 812 may include, for example, a subscriber identity module (SIM), a universal integrated circuit card (UICC), a universal subscriber identity module (USIM), a removable user identity module (R-UIM), or any other smart card. The UIM 812 typically stores information elements related to a mobile subscriber. The UIM 812 in form of the SIM card is well known in Global System for Mobile (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 800 can support one or more input devices 820 and one or more output devices 830. Examples of the input devices 820 may include, but are not limited to, a touch screen/a display screen 822 (e.g., capable of capturing finger tap inputs, finger gesture inputs, multi-finger tap inputs, multi-finger gesture inputs, or keystroke inputs from a virtual keyboard or keypad), a microphone 824 (e.g., capable of capturing voice input), a camera module 826 (e.g., capable of capturing still picture images and/or video images) and a physical keyboard 828. Examples of the output devices 830 may include, but are not limited to, a speaker 832 and a display 834. Other possible output devices can include piezoelectric or other haptic output devices. Some devices can serve more than one input/output function. For example, the touch screen 822 and the display 834 can be combined into a single input/output device.

A wireless modem 840 can be coupled to one or more antennas (not shown in FIG. 8) and can support two-way communications between the processor 802 and external devices, as is well understood in the art. The wireless modem 840 is shown generically and can include, for example, a cellular modem 842 for communicating at long range with the mobile communication network, a Wi-Fi compatible modem 844 for communicating at short range with an external Bluetooth-equipped device or a local wireless data network or router, and/or a Bluetooth-compatible modem 846. The wireless modem 840 is typically configured for communication with one or more cellular networks, such as a GSM network for data and voice communications within a single cellular network, between cellular networks, or between the electronic device 800 and a public switched telephone network (PSTN).

The electronic device 800 can further include one or more input/output ports 850, a power supply 852, one or more sensors 854 for example, an accelerometer, a gyroscope, a compass, or an infrared proximity sensor for detecting the orientation or motion of the electronic device 800 and biometric sensors for scanning biometric identity of an authorized user, a transceiver 856 (for wirelessly transmitting analog or digital signals) and/or a physical connector 860, which can be a USB port, IEEE 1294 (Fire Wire) port, and/or RS-232 port. The illustrated components are not required or all-inclusive, as any of the components shown can be deleted and other components can be added.

The one or more operations of the application server 700 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components)) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the application server 700 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the disclosure, as discussed above, may be practiced with steps and/or operations in a different order, and/or with hardware elements in configurations, which are different than those which are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A male masturbating apparatus, comprising:

an elongated hollow frame member comprising a first end, a second end, and a sidewall, the sidewall including a hollowed-out structure defining a through passage between an interior and an exterior of the elongated hollow frame member;

an actuator mounted to the elongated hollow frame member, the actuator being operable between a first position and a second position, and the actuator being configured to be operated to the second position from the first position by being pressed by a hand of a user while the hand of the user is grasping the male masturbating apparatus; and a flexible sleeve mounted to the elongated hollow frame member along a length extending from the first end to the second end of the elongated hollow frame member, the flexible sleeve comprising a flexible opening positioned proximate to the first end of the elongated hollow frame member and a cavity configured to have a penis of a user inserted therein through the flexible opening, and the flexible sleeve being configured to undergo elastic deformation caused by operating the actuator to the second position from the first position, wherein:

a size of the hollowed-out structure is no smaller than a size of the actuator so as to allow for mounting of the actuator to the elongated hollow frame member, and to provide space to receive the actuator, a connection portion between the actuator and the elongated hollow frame member is at least partially flexible and deformable to allow the actuator to be operable between the first position and the second position, and operating the actuator to the second position from the first position causes the flexible sleeve to undergo elastic deformation and causes the cavity of the flexible sleeve to decrease in size.

2. The male masturbating apparatus as claimed in claim 1, further comprising:

a stimulation component mounted to the flexible sleeve and arranged on a lateral wall of the flexible sleeve, the stimulation component overlapping with a direction of change from the first position to the second position of the actuator and being configured to provide stimulation to the penis of the user inserted into the cavity of the flexible sleeve through the flexible opening, wherein operating the actuator to the second position from the first position causes the stimulation component to provide stronger stimulation to the penis.

3. The male masturbating apparatus as claimed in claim 2, further comprising:

a control unit housed within the elongated hollow frame member, the control unit being configured to provide a control output to the stimulation component.

4. The male masturbating apparatus as claimed in claim 3, further comprising:

a plurality of sensors housed within the elongated hollow frame member, the plurality of sensors being configured to detect at least a contact force between the penis inserted in the flexible sleeve and the flexible sleeve.

5. The male masturbating apparatus as claimed in claim 4, wherein the contact force represents a magnitude of an external force applied on the actuator to operate the actuator to the second position from the first position.

6. The male masturbating apparatus as claimed in claim 4, wherein the control unit is configured to provide the control output based at least on a magnitude of the contact force.

7. The male masturbating apparatus as claimed in claim 4, wherein an intensity of the control output is based at least on an operating status of each of the plurality of sensors and a magnitude of an external force applied on the actuator.

8. The male masturbating apparatus as claimed in claim 4, wherein the control unit is configured to transmit a message indicating at least a magnitude of the contact force to an interactive application installed in a user device associated with the user.

9. The male masturbating apparatus as claimed in claim 8, wherein the control unit is configured to produce the control output based at least on receipt of a control pattern from the interactive application, and the control pattern is generated by the interactive application based at least on the magnitude of the contact force.

10. The male masturbating apparatus as claimed in claim 9, wherein the control pattern is transmitted to another user device associated with another user of the interactive application through an application server based on at least one of inputs provided by the user in the interactive application, and the control pattern operates an adult toy associated with the another user to provide vibrotactile output for enabling the another user to experience sexual stimulation.

11. The male masturbating apparatus as claimed in claim 4, wherein the plurality of sensors and the actuator are mounted on diametrically opposite sides of the male masturbating apparatus.

12. The male masturbating apparatus as claimed in claim 3, further comprising:

a plurality of sensors housed within the elongated hollow frame member, the plurality of sensors being configured to detect depth information based on a level of insertion of the penis of the user within the flexible sleeve through the flexible opening.

13. The male masturbating apparatus as claimed in claim 1, wherein the first end of the elongated hollow frame member has an open configuration to allow insertion of the penis of the user through the flexible opening of the flexible sleeve.

14. The male masturbating apparatus as claimed in claim 1, wherein the first end of the elongated hollow frame member has an open configuration to allow insertion of the penis of the user through the flexible opening of the flexible sleeve, and the second end of the elongated hollow frame member has a closed configuration.

15. The male masturbating apparatus as claimed in claim 1, further comprising a first antiskid part and a second antiskid part mounted to the elongated hollow frame member for enhancing a grip by the user of the male masturbating apparatus.

16. The male masturbating apparatus as claimed in claim 1, wherein a material of the flexible sleeve is softer than a material of the actuator.

17. The male masturbating apparatus as claimed in claim 1, wherein:

the actuator comprises a flexible actuator, and the flexible actuator is configured to have a threshold flexibility which inhibits further movement of the flexible actuator axially relative to the elongated hollow frame member.

18. The male masturbating apparatus as claimed in claim 17, wherein:

the flexible actuator generates elastic deformation in response to operation thereof to the second position, and the flexible actuator is a squeeze button.

19. The male masturbating apparatus as claimed in claim 1, wherein the flexible sleeve is configured to resume an original state thereof upon release of a force acting on the actuator thereby causing the actuator to return to the first position from the second position.

20. The male masturbating apparatus as claimed in claim 1, wherein the flexible sleeve is configured to provide a suction stimulation due to reciprocating operation of the actuator between the first position and the second position.

* * * * *